Figure 1:
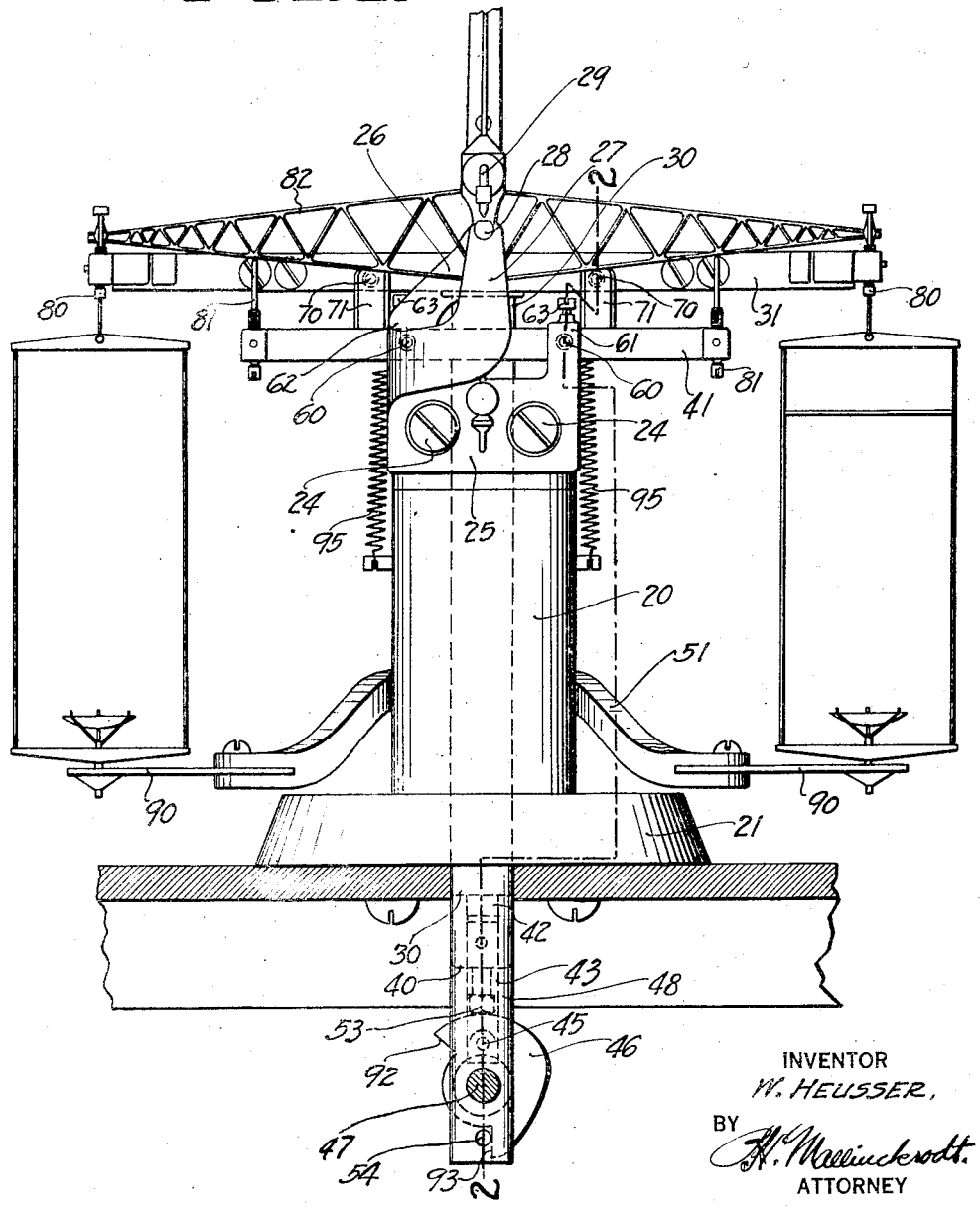

May 11, 1926.                                                          1,583,883
W. HEUSSER
CENTER COLUMN WITH APPURTENANCES FOR PRECISION BALANCES
Filed July 18, 1925        5 Sheets-Sheet 1

INVENTOR
W. HEUSSER,
BY
H. Mallinckrodt.
ATTORNEY

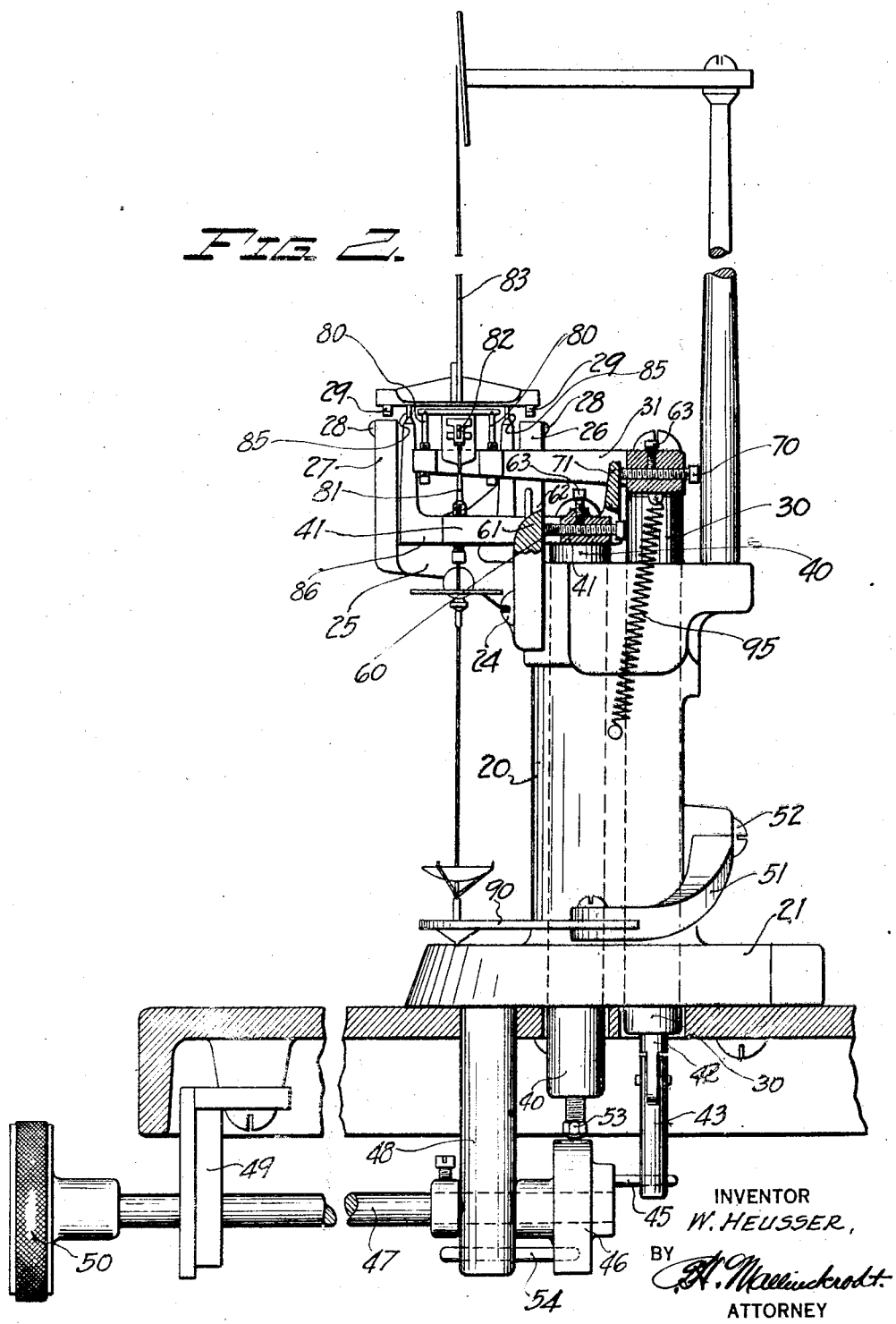

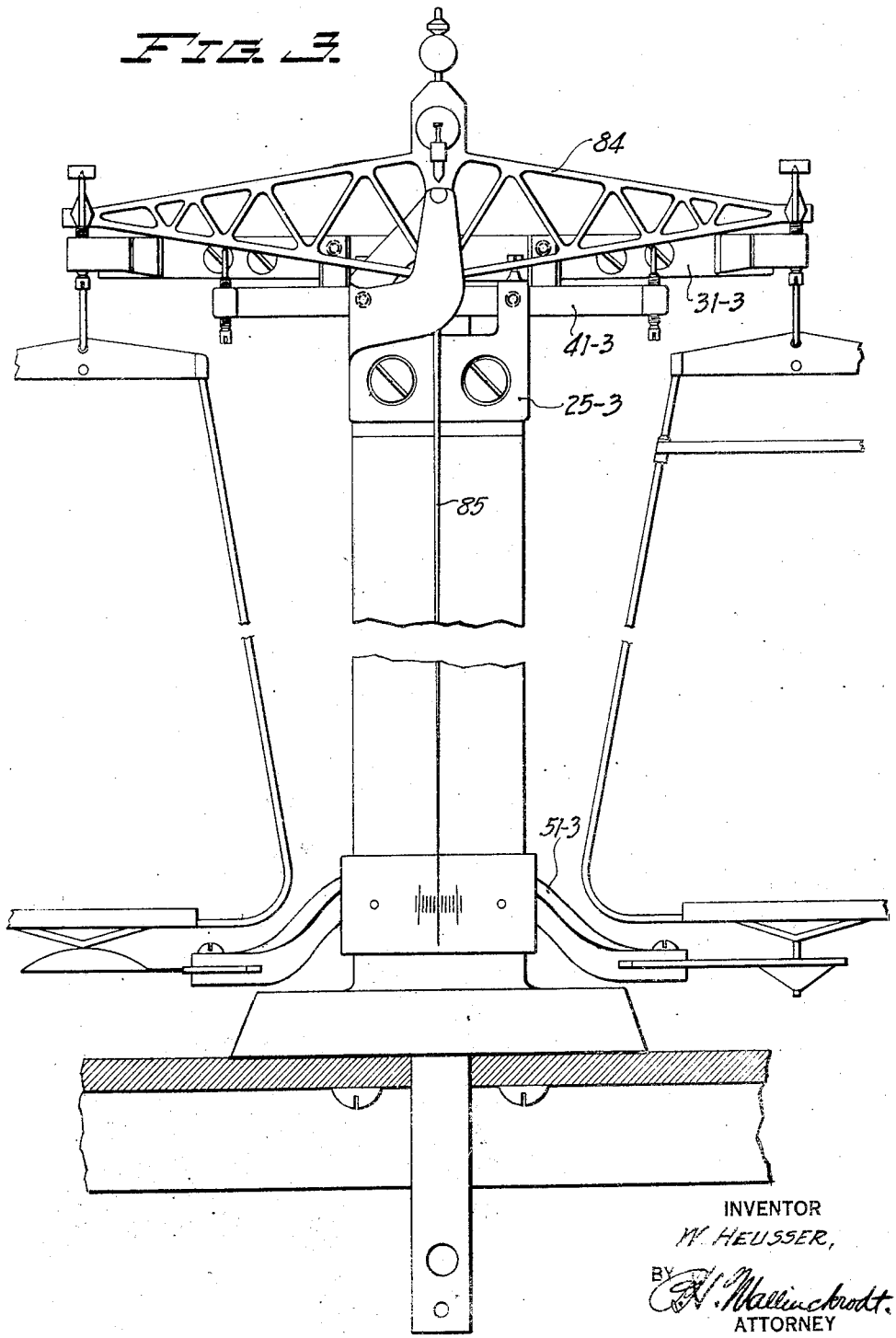

May 11, 1926.
W. HEUSSER
1,583,883
CENTER COLUMN WITH APPURTENANCES FOR PRECISION BALANCES
Filed July 18, 1925 5 Sheets-Sheet 4
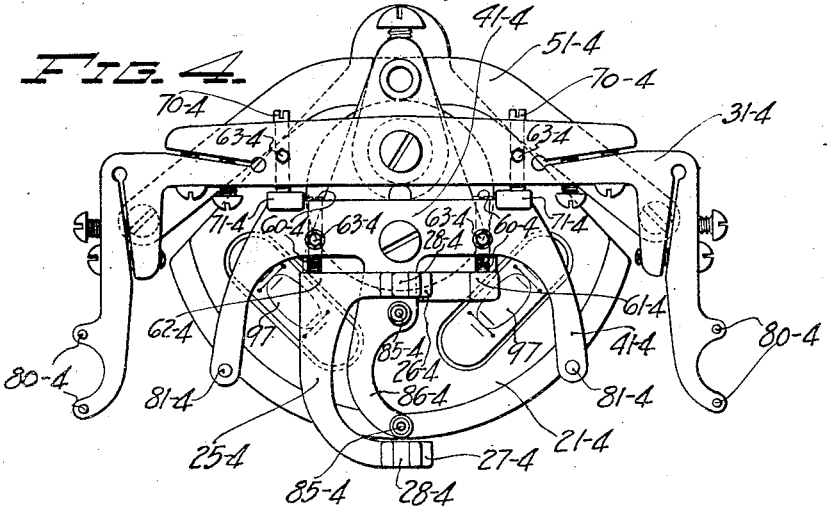
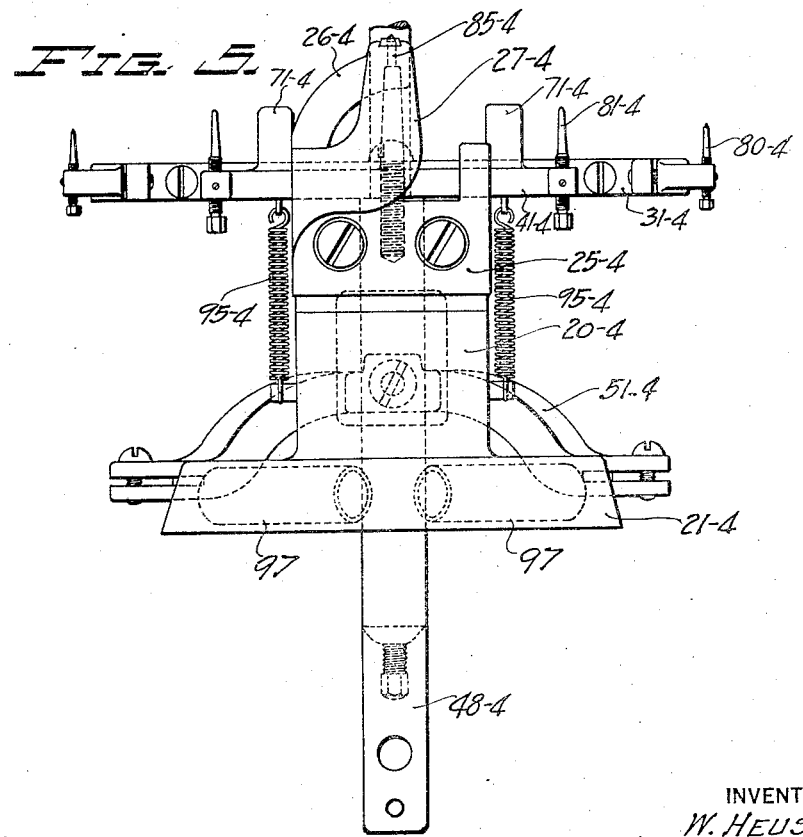
INVENTOR
W. HEUSSER,
BY
ATTORNEY May 11, 1926.

W. HEUSSER 1,583,883

CENTER COLUMN WITH APPURTENANCES FOR PRECISION BALANCES

Filed July 18, 1925   5 Sheets-Sheet 5

INVENTOR
*W. Heusser,*
BY
*C. H. Mallinckrodt.*
ATTORNEY

Patented May 11, 1926.

1,583,883

UNITED STATES PATENT OFFICE.

WILFRID HEUSSER, OF SALT LAKE CITY, UTAH.

CENTER COLUMN WITH APPURTENANCES FOR PRECISION BALANCES.

Application filed July 13, 1925. Serial No. 44,480.

This invention relates to a column with appurtenances, comprising a beam support, beam bearing support, pan hanger support, pan rest support, and operating mechanism, for precision balances, and its principal objects are:

First. To provide a construction adapted to all classes of precision balances; for instance, assay balances with pointers directed upwardly, and analytical balances with pointers directed downwardly.

Second. To provide guiding members having their lines of action remote from each other and from the axis of the column.

Third. To have adjusting means arranged to take care both of the compensation for wear in the guides and also the aligning of the pan hanger support and the pan rest support.

Fourth. To provide an economical and compact design for the beam support, beam bearing support, pan hanger support and pan rest support, and one in which these parts shall be interchangeable in the different classes of balances.

It is well known that in balances designed for precise weighing in scientific and technical work, extreme accuracy is required. In order to maintain this extreme accuracy during the life of the balance, simple and efficient means should be provided for taking up lost motion, however slight, due to the wear of the operating parts. At the same time, positive means must be provided for keeping the balance in adjustment, as the great delicacy required makes it necessary to eliminate all sources of possible error.

In attaining the objects previously outlined, I provide in the balance structure, a center column of novel construction. Within this column, which is of generous cross-section, are guideways for slidable standards, usually two, one of which carries the beam support, while the other carries the pan hanger support and the pan rest support. The center column has a broadly flanged foot by means of which it is secured to the balance base. At the top of the column is a head portion having upwardly projecting arms spaced apart from each other, and arranged to carry the beam bearings, thus constituting the beam bearing support.

The beam support carries vertically acting guides which are arranged to co-operate with corresponding adjustable contacts mounted in the pan hanger support. The beam support also has mounted in it, adjustable contacts which are arranged to co-operate with corresponding vertically acting guides forming parts of the beam bearing support. All these guides and adjustable contacts are spaced apart, remote from each other, and are positioned radially around the axes of the slidable standards so as to secure radius arms of considerable length, thereby reducing the wear between the adjustable contacts and the guides, and preventing any undue play or lost motion, horizontally, between the beam bearing support and the beam support, and again, between the beam support and the pan hanger support. The pan rest support is also rigidly mounted on the same slidable standard as the pan hanger support, and consequently, these two parts have a constant position in relation to each other.

The body of the column may be formed integrally with the foot portion, which is mounted on the balance base. This foot carries a depending standard, the latter providing one bearing and a stop for the operating mechanism.

The features of this invention, for which the protection of Letters Patent is desired, are collectively grouped in the claims concluding this specification.

Figure 6:
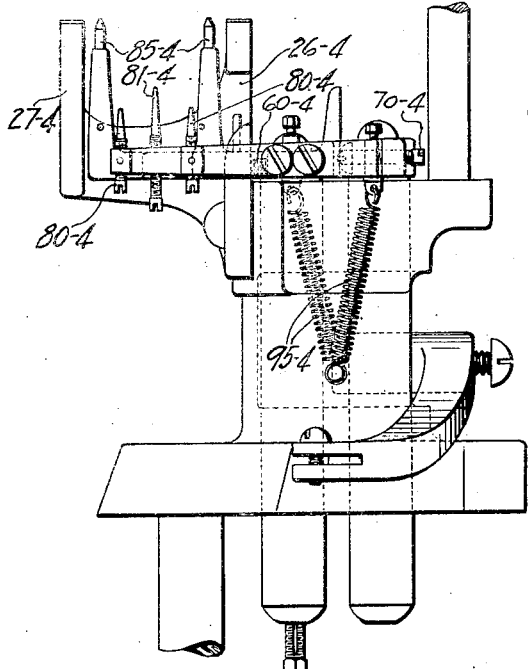
Figure 7:
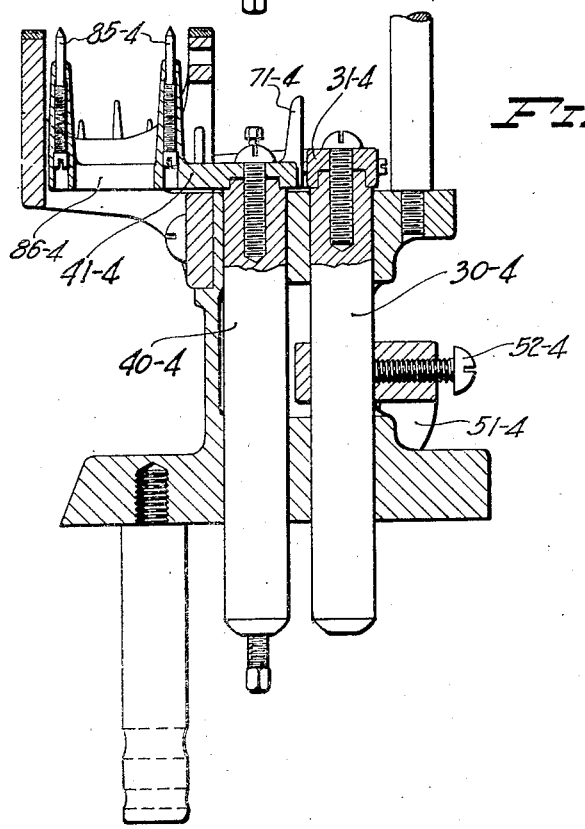

In the drawings,

Fig. 1 represents a fragmentary front elevation, partly in section, of an assay balance constructed in accordance with my invention;

Fig. 2, a fragmentary side elevation thereof, partly in section on line 2—2 in Fig. 1;

Fig. 3, a fragmentary front, elevation partly in section, of an analytical balance constructed in accordance with my invention;

Fig. 4, a plan of the invention separate from the balance casing and other balance appurtenances, and Figs. 5, 6 and 7, respectively, a front elevation, a side elevation with part broken away, and a transverse vertical center section corresponding to Fig. 4.

In Figs. 5, 6 and 7, some of the operating parts, for convenience, are shown in abnormal positions. It is to be noted that the column illustrated in Figs. 5, 6 and 7, is for an assay balance of smaller size than that illustrated in Figs. 1 and 2.

Referring to the drawings (Figs. 1 and 2), 20 represents the column, which may be formed integrally with the foot 21. Mounted on the top of the column 20 and rigidly secured by the screws 24, is the beam bearing support 25. This has the upwardly extending arms 26 and 27, which carry the bearings 28 for supporting the beam edges 29.

At 30 is a standard vertically slidable in the column 20. This standard carries the rigidly mounted hanger support 31, in which are threaded the staffs 80 forming adjustable rests for the hanger bearings. At 40 is a second standard vertically slidable in the column 20, and rigidly mounted on the top thereof, is the beam support 41, in which are threaded the staffs 81 forming adjustable rests for the beam 82. Other beam rests 85 are carried on arm 86 integral with 41.

In order to raise and lower the standard 30, it carries at its lower end, the rigid extension 42, to which is pivoted the connecting rod 43, the latter being engaged by the crank pin 45 fastened eccentrically in the cam disk 46. Cam disk 46 is rigidly mounted on the end of the shaft 47, the shaft having one of its ends journalled in the depending standard 48, rigidly fastened in the foot 21. The other end of the shaft 47 is journalled in the bracket 49. Rotation is imparted to the shaft 47 by the hand knob 50. The standard 30 also carries the pan rest support 51, rigidly fastened thereto by means of the set screw 52, the pan rest being shown at 90.

The standard 40, at its lower end, carries the adjustable screw 53, which latter bears on the cam 46, being raised and lowered thereby, the standard being urged by springs 95.

The pin 54, rigidly mounted on the standard 48, forms a limit stop for the cam disk 46, by striking faces 92 and 93.

By turning the knob 50 in one direction, motion is imparted simultaneously, but in different degrees, to the standards 30 and 40, the relative motion between the standards being properly predetermined.

In order to adjust the beam support and beam bearing support horizontally with relation to each other and to the axis of the column, screws 60 are provided; these screws are threaded in the beam support 41 and may have plane ends so as to bear against the inner faces of lugs 61 and 62. These lugs preferably form integral parts of the beam bearing support 25. The screws 60 may be locked in place by means of the set screws 63.

In a similar manner, the proper relationship is held between the beam support 41 and the hanger support 31. In this latter instance, screws 70 are provided; these are threaded in the hanger support 31 and have plane ends arranged to bear against the lugs 71, which latter form integral parts of the beam support 41. The beam 82 is provided with the customary pointer 83, directed upwardly.

In Fig. 3, the analytical balance with beam 84 and downwardly directed pointer 85, is equipped with the beam bearing support 25—3, the beam support 41—3, the pan hanger support 31—3, and the pan rest support 51—3, these parts being substantially similar to the parts 25, 41, 31 and 51, respectively, described for the previously mentioned balance.

Thus, it will be evident that this invention is applicable to both types of balances with equal advantages gained in each instance, also that it is applicable whether the columns are longer or shorter.

Figs. 4, 5, 6 and 7 show the more prominent parts of the present invention separately from the balance structure proper, and free from a number of details which do not form essential parts of this invention, thus indicating in a clearer manner the relations of the essential parts to each other. The characteristic parts are similar to those already described in connection with those in Figs. 1 and 2, but these parts are here shown for a balance of a different size, Column 20—4, in Figs. 4 to 7, corresponds to column 20 in Figs. 1 and 2; foot 21—4 to foot 21; beam bearing support 25—4 to 25; arms 26—4 and 27—4 to 26 and 27; beam bearings 28—4 to 28; standard 30—4 to 30; hanger support 31—4 to 31; standard 40—4 to standard 40; beam support 41—4 to 41; and so on.

While a specific embodiment of this invention is herein shown and described, all the detailed parts may, or may not, be in the preferred forms, and further, the preferred forms may be varied from time to time as the development of the invention and the arts to which it appertains, progress. Therefore, that which forms an essential and characteristic part of this invention will be discernible from the claims in which its spirit is generalized.

Having fully described my invention, what I claim is:

1. A column, a beam bearing support fixed thereon, beam support guides spaced apart from each other on the said beam bearing support, a beam support movably disposed in relation to said beam support guides, contacting members adjustably disposed in the said beam support and arranged to register and co-act with the said beam support guides, a hanger support movably disposed in relation to said beam support, hanger support guides spaced apart from each other on the said beam support, and contacting members adjustably disposed in the said hanger support, said contacting members being arranged to register, and co-act, with the said hanger support guides.

2. A column, a beam bearing support fixed thereon; a beam support and a hanger support movably disposed in relation to each other and to the said beam bearing support, and guides with adjustable contacting members spaced apart from each other on the said beam bearing support, beam support and hanger support, to hold the said beam bearing support, beam support and hanger support in alignment with one another.

3. A column, a beam bearing support fixed thereon, said support comprising upwardly projecting arms, beam bearings carried by said arms, guides spaced apart from each other and fixed on said beam bearing support, a beam support arranged in vertically slidable relation with said guides, and contacting members adjustably arranged in the said beam support, said contacting members being spaced apart from each other to engage said guides.

4. A column, a standard slidable therein, a beam support having guides mounted on said standard, a second standard slidable in said column, a hanger support mounted on said second standard, and adjustable contacting members carried by said hanger support, said contacting members being arranged to engage said guides.

5. A column, a standard slidable therein, a beam support having guides mounted on said standard, a second standard slidable in said column, a pan hanger support and a pan rest support mounted on said second standard, and adjustable contacting members carried by said hanger support, said contacting members being arranged to engage said guides.

6. A column, a beam bearing support fixed thereon, said support comprising upwardly projecting arms, beam bearings carried by said arms, guides spaced apart from each other and fixed on said beam bearing support; a standard vertically slidable in said column, a beam support carried by said column, contacting members adjustably arranged in said beam support and spaced apart from each other to engage said guides, a second standard vertically slidable in said column, a hanger support mounted on the second standard, second guides carried by said beam support, and second adjustable contacting members carried by said hanger support, said second contacting members being engaged to engage said second guides.

7. A column, a beam bearing support mounted thereon, guides spaced apart from each other on said beam bearing support, a beam support in vertical slidable relation to said beam bearing support, contacting members adjustably disposed in said beam support and arranged to engage said guides, second guides carried by said beam support, a hanger support vertically slidable in relation to said beam support, and second contacting members adjustably disposed in said hanger support, said guides and contacting members being spaced apart from each other in co-acting units on either side of a transverse axial plane through the said column.

8. A column, standards vertically slidable in said column, guide portions and adjustable contacting members arranged to co-act with said guide portions for holding said standards in fixed axial relation to each other, and an actuating mechanism arranged to impart motion to said slidable standards.

9. A column, standards vertically slidable in said column, guide portions and adjustable contacting members arranged to co-act with said guide portions for holding said standards in fixed axial relation to each other, a depending standard carried by said column, and an actuating mechanism arranged to impart motion simultaneously to said slidable standards, said actuating mechanism being journaled in said depending standard.

10. A column, a standard slidable therein, a support carried by said standard, and guides spaced apart from each other on opposing sides of said column, each guide provided with a co-acting adjustable contacting member arranged to hold said support in predetermined axial relation to said column.

In testimony whereof, I sign my name hereto.

WILFRID HEUSSER.